United States Patent [19]

Belart et al.

[11] Patent Number: 4,717,210

[45] Date of Patent: Jan. 5, 1988

[54] BRAKE-SLIP-CONTROLLED BRAKE SYSTEM

[75] Inventors: Juan Belart, Walldorf; Woffram Seibert, Pfungstadt; Norbert Ocvirk, Offenbach, all of Fed. Rep. of Germany

[73] Assignee: Alfred Teves GmbH, Frankfurt am Main, Fed. Rep. of Germany

[21] Appl. No.: 879,216

[22] Filed: Jun. 27, 1986

[30] Foreign Application Priority Data

Jul. 5, 1985 [DE] Fed. Rep. of Germany ....... 3524120

[51] Int. Cl.$^4$ ............................................. B60T 8/44
[52] U.S. Cl. ..................................... 303/114; 303/92
[58] Field of Search ................ 60/545, 547.1, 548; 303/92, 93, 101, 103, 110, 111, 113, 114

[56] References Cited

U.S. PATENT DOCUMENTS

| | | | |
|---|---|---|---|
| 4,555,144 | 11/1985 | Belart et al. | 303/114 X |
| 4,641,895 | 2/1987 | Belart et al. | 303/114 X |
| 4,643,487 | 2/1987 | Neubrand | 303/114 |

FOREIGN PATENT DOCUMENTS

| | | |
|---|---|---|
| 2908480 | 10/1980 | Fed. Rep. of Germany . |
| 2948428 | 6/1981 | Fed. Rep. of Germany . |
| 3040562 | 5/1982 | Fed. Rep. of Germany . |
| 3427070 | 1/1986 | Fed. Rep. of Germany . |
| 3423029 | 2/1986 | Fed. Rep. of Germany . |

*Primary Examiner*—Duane A. Reger
*Attorney, Agent, or Firm*—James B. Raden; Robert P. Seitter

[57] ABSTRACT

A brake-slip-controlled brake system with a brake-pedal-operated master cylinder (2) assisted by auxiliary energy, with valves (42 through 45 and 66 through 69) in the pressure medium supply lines (40, 41) from the master cylinder (2) to the wheel brakes (10, 17, 38, 39). An electronic circuit configuration is provided for generating valve control signals, and with valves (11, 53, 57, 58, 61, 56) for the supply of pressure medium from the booster chamber (25) into the working chambers (8, 15) of the master cylinder (2). An intermediate piston (18) is sealingly guided in a separate pressure chamber (24) and is arranged between the booster piston (21) and the piston (7) of the master cylinder (2). The pressure chamber (24) is connectible with the return line (48, 76) by way of a check valve (53). The intermediate piston (18) is coupled with the booster piston (21) and it acts on the piston (7) of the master cylinder (2). So as to avoid a drop of the brake pedal (28) during a critical slip phase while braking, a return flow of the pressure medium existing between the piston (7) of the master cylinder (2) and the intermediate piston (18) is prevented by closing the check valve (53).

5 Claims, 1 Drawing Figure

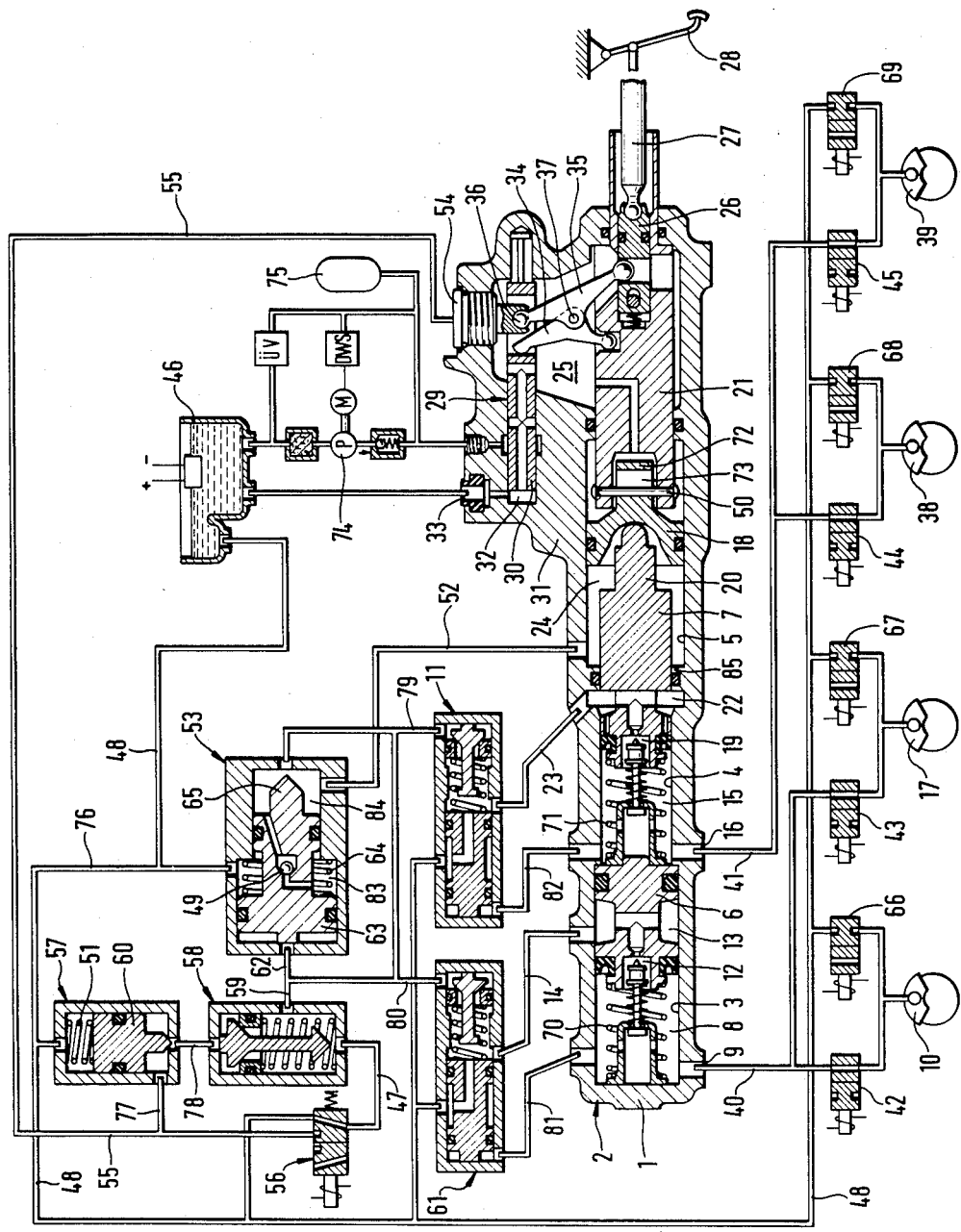

BRAKE-SLIP-CONTROLLED BRAKE SYSTEM

BACKGROUND OF THE INVENTION

This invention relates to a brake-slip-controlled brake system with a pedal-operated master cylinder assisted by auxiliary energy, with sensors for detecting the rotational behaviour of the wheels and the vehicular velocity or respective measurable values. Valves are provided in the pressure medium supply lines from the master cylinder to the wheel brakes. An electronic circuit configuration is provided for logically combining and handling the sensor signals as well as for generating valve control signals. Valves are provided for feeding pressure medium from the booster chamber into the working chamber of the master cylinder.

A brake system of this type is known (German patent application No. P 30 40 562.0) where a master cylinder is provided which has two master cylinder pistons which are connected one after the other, and which is operable by way of a piston rod connected with a brake pedal. When an actuating force is applied to the brake pedal the gaskets of the master cylinder pistons override so-called expansion ports and thus interrupt the connections between the working chambers of the master cylinder and an unpressurized storage reservoir. Upon a further displacement of the master cylinder pistons there results a pressurization of the working chambers of the master cylinder and the vehicular brakes connected to the working chambers are applied. Associated with the vehicle brakes are electromagnetically operable valves which keep the wheel slip down to a favorable extent upon suitable control by slip monitoring electronics.

Between the pedal-operable piston rod and the master cylinder pistons a throttle valve is arranged which consists of a piston axially displaceable within the master cylinder bore and having a pedal-close valve seat and of a valve closure member formed fast with the piston rod. As long as there is no danger of a lock-up the pedal force will be transmitted mechanically to the master cylinder pistons by way of the piston rod and the piston carrying the valve seat of the throttle valve. When an unduly high slip at one or several of the vehicle brakes is detected by the slip monitoring electronics, an electric-motor driven pressure medium pump will be operated. The pump will suck hydraulic medium from the unpressurized storage reservoir, supplying it to the throttle valve. Thus, as a function of the actuating force applied to the brake pedal a dynamic pressure will result at the delivery side of the pressure medium pump. The pressure will be tranmitted to the pedal-close front sides of the master cylinder pistons where, by way of axial bores of the master cylinder pistons and by way of gaskets acting a non-return valves, the pressure medium may flow into the brake circuits connected to the working chambers if pressure medium had been tapped from the wheel brakes for the purpose of a pressure reduction.

Moreover, the dynamic pressure generated at the delivery section of the pump by means of the throttle valve will pressurize a positioning piston having a larger effective surface than the master cylinder pistons and being displaced contrary to the direction of actuation against a stop formed fast with the housing. In doing so, the positioning piston will come into mechanical contact with the piston carrying the valve seat of the throttle valve and will return the latter, if necessary, against the pedal force in the brake release direction. The positioning piston will ensure that there will always remain a sufficient amount of fluid in the working chambers of the tandem master cylinder. A drop of the master cylinder pistons down to the bottom of the master cylinder will thus be impossible.

Upon a failure of the pressure medium pump or of the pump drive there will be no pressurization of the positioning piston. Upon an application of the brake in such cases of trouble, the piston with the valve seat will abut on the positioning piston and displace the same against the force of a relatively weak compression spring in the direction of actuation. This displacement will be transmitted to the master cylinder pistons as in normal braking actions, thus respectively the working chambers of the master cylinder and the wheel brakes connected to them being pressurized. A normal operation of the motor vehicle's brakes will therefore be ensured in any case in the above-mentioned circumstances of trouble.

In brake systems of the type referred to above it is known that at first a certain servo pressure must be generated by the brake valve or rather control valve before pressurizing the wheel brakes connected to the master brake cylinder.

It is thus an object of the present invention to further develop a hydraulic brake system with the characteristics described above such as to ensure that, during the braking action, a drop of the brake pedal will be avoided and the pistons of the master cylinder will remain in the positions adopted by them immediately before the dynamic pressure medium supply into the wheel brakes. Moreover, it is to be ensured that upon release of the brake pedal the same will return at once into its initial position.

SUMMARY OF THE INVENTION

According to this invention this object is achieved in that an intermediate piston sealingly guided in a separate pressure chamber is arranged between the booster piston and the piston of the master cylinder. The pressure chamber is connectible with the return line by way of a check valve, whose closure member is acted upon by the pressure of the booster chamber. The intermediate piston is coupled with the booster piston and acts on the piston of the master cylinder.

Preferably, a pressure chamber is provided within the housing of the master cylinder. Into this pressure chamber the push rod connected with the piston of the master cylinder, on the one hand, and the booster piston or a member cooperating with the same on the other hand, plunge into. Between the push rod and the booster piston the intermediate piston is guided in a sealing manner in the pressure chamber. The annular chamber, which is arranged in front of the intermediate piston and which surrounds the push rod, is filled with pressure medium and communicates with the reservoir. The pressure line, which leads to the reservoir, is locked by a valve after a predetermined braking pressure has been reached.

Advantageously, a pressure limiting valve and an inlet valve are inserted into the pressure medium line leading from the booster chamber to the working chambers of the master cylinder. Upon the switching pressure being reached the pressure limiting valve permits pressure medium to pass and the inlet valve interrupts a communication of the working chambers of the master cylinder with the reservoir and establishes the communication from the pressure limiting valve to the working chambers.

Expediently, and in addition to the pressure limiting valve and the inlet valve, a check valve is inserted into the pressure line connecting the booster chamber with the annular chamber in front of the intermediate piston. The check valve closing the pressure medium passage from the inlet valve to the annular chamber when the pressure at the outlet of the inlet valve reaches a minimum level.

BRIEF DESCRIPTION OF THE DRAWING

This invention permits various embodiments. One of them is schematically represented in the accompanying drawing wherein the single FIGURE illustrates a longitudinal section through a braking pressure generator, with the wheel brakes, hydraulic accumulator, supply reservoir, and valves which cooperate with the same being represented in the form of symbols.

DETAILED DESCRIPTION

In the drawing, the reference numeral 1 designates the housing of the braking pressure generator wherein a cylinder bore is arranged with essentially three bore sections 3, 4, 5. Bore section 3 has an enlarged diameter in relation to bore section 4, while bore section 5 has the largest diameter of the cylinder bore.

Two pistons 6, 7 of the master cylinder are arranged in an axially displaceable manner within the bore sections 3 and 4. Together with the housing 1, the master cylinder piston 6 confines a working chamber 8 which, by way of a housing port 9 and respective pressure lines 40, is in hydraulic communication with the wheel brakes 10, 17 arranged, for example, at the front axle of an automotive vehicle.

The master cylinder piston 6 has a central valve 12 which, in case of a predeterminable slight axial displacement of the master cylinder piston 6 in the direction of actuation, will interrupt a communication between the working chamber 8 and an annular chamber or filling stage chamber 13, As soon as the central valve 12 is closed, a communication simultaneously will be interrupted between a pressure line 14 and the working chamber 8, thus the brake circuit connected to the working chamber 8 being a closed hydraulic system.

The piston 7 of the master cylinder 2 lies coaxially with regard to the piston 6 and, together with the latter, confines a working chamber 15 where, by way of a housing port 16, a hydraulic connection 41 is established to the wheel brakes 38, 39. The master cylinder piston 7 also has a central valve 19 corresponding to the central valve 12 in the master cylinder piston 6 and having the same mode of operation. Moreover, a push rod 20 is formed fast with the pedal-close master cylinder piston 7. The push rod 20 penetrates the bore section 5 of the cylinder bore.

By way of an intermediate piston 18, the push rod 20 supports itself with its pedal-close end at a booster piston 21. An annular chamber is formed between the master cylinder piston 7 and the cylinder bore, the annular chamber representing the filling stage chamber 22. A pressure line 23 leads from the filling stage chamber 22 to a separating valve 11.

The end of booster piston 21 averted from the filling stage chamber 22 or rather from the annular chamber 24 surrounding the push rod 20 confines a pressure chamber 25 of a hydraulic power booster wherein an auxiliary pressure (controlled pressure) can be established which depends on the intensity of the brake application. The booster piston 21 is in communication with an actuating piston 26 which, on its part, is mechanically coupled with a brake pedal 28 by way of a pedal rod 27. A further component of the hydraulic power booster is a brake valve 29 having a control slide 30 which, as a function of the position of the brake pedal 28, adopts a certain relative position with respect to a valve housing 31 surrounding the control slide 30. Referring to the drawing figure, on the left-hand side of the control slide 30 a booster return chamber 32 is formed which, by way of a housing port 33, is in communication with the unpressurized supply reservoir 46.

The control slide 30 of the brake valve 29 is further acted upon by a lever actuating mechanism essentially consisting of two levers 34, 35 arranged parallel to each other. The lever 35 has a spherical head 36 firmly connected with the housing. The other end of the lever 35 engages a recess of the actuating piston 26. Referring to the drawing, the upper end of the lever 34 rests at the control slide 30 of the brake valve 29. The lower end of the lever 34 as seen in the drawing is abutted on the booster piston 21. The levers 34, 35 are connected with each other by way of a pivot 37. The described brake system works as follows:

In the brake release position all the moving parts adopt the positions evident from the drawing. When an actuating force is applied to the pedal 28 the actuating piston 26 will move to the left in the drawing. As a function of the position of the brake pedal 28 an auxiliary hydraulic pressure is established by way of the brake valve 29 communicating with a pressure accumulator 75. A certain pressure level existing in the pressure chamber 25 of the hydraulic power booster, the forces which counteract a displacement of the booster piston 21 will be overcome. Thus the booster piston 21 will start moving in the direction of actuation, with the pressure medium displaced out of the annular chamber 24 being urged to the check valve 53 by way of a pressure medium line 52. From the check valve 53, the pressure medium will be urged into the supply reservoir 46 by way of pressure lines 62, 59, 47, 48. The pressure built up in the working chamber 15 will pressurize the wheel brakes 38, 39 of the rear axle of the automotive vehicle. Moreover, the hydraulic pressure in the working chamber 15 will ensure that the master cylinder piston 6 also will be moved in the direction of actuation. Thus, in the working chamber 8 a hydraulic pressure will likewise be generated which will be supplied to the wheel brakes 10, 17 by way of the housing port 9 and a respective pressure line 40.

By way of the connecting socket 54 and the pressure line 55, the pressure prevailing in the pressure chamber 25 also will pressurize the directional valve or main valve 56 and the pressure limiting valve 57. With the main valve 56 closed, the pressure medium will flow from the pressure limiting valve 57 to the inlet valve 58 and thence to the two separating valves 11 and 61 by way of the pressure line 59, 79, 80. From separating valves 11 and 61 it will flow to the filling stage chambers 13 and 22, passing on to the working chambers 8 and 15, and from these chambers it will flow to the wheel brakes 10, 17, 38, 39. The above-described pressure medium flow, however, will take place only if the pressure prevailing in the pressure line 55 has reached a certain pressure level (e.g., 80 bars) sufficient to move the piston 60 of the pressure limiting valve 57 upwards against the force of the piston spring 51. As the controlled pressure, by way of the branch line 62, also will act on the piston 63 of the check valve 53 the piston 63 will be moved to the right against the force of the piston spring 64 until the closure member 65 is seated firmly on its valve seat and lock the pressure line 52 which connects the annular chamber 24 with the check valve 53. The pressure medium existing in the annular chamber 24 now is locked in. Thus, the intermediate piston 18 will not be able to move to the left and will block the brake pedal 28 with the pedal rod 27, the actuating piston 26, and the booster piston 21. The pressure medium flowing to the working chambers 8, 15 by way of the pressure line 59, the separating valves 11,61, and the pressure lines 14,23 now can pressurize the wheel brakes 10, 17 and 38, 39, respectively, as solenoid valves 42, 43, 44, 45 are inserted into the brake lines 40, 41 connected with the housing ports 9, 16, solenoid valves 42, 43, 44, 45 being in their open positions in the case just described.

If one of the wheels of the vehicle gets into a critcal slip range slip monitoring electronics not illustrated in detail in the drawing will switch the main valve 56 from the illustrated locking position into the open position so that the controlled pressure can directly flow to the wheel brakes 10, 17, 38, 39 by way of the pressure line 55, the main valve 56, the pressure line 47, the inlet valve 58, the pressure lines 59, 79, 80, the two separating valves 11,61, the two working chambers 8, 15, and the solenoid valves 42,43, 44, 45. In case the slip monitoring electronics detect an unduly high slip at one of the vehicle wheels the respective solenoid valve 66 or 67 or 68 or 69 which permits the return of the pressure medium from the wheel brake into the reservoir 46 by way of return line 48 will be swtiched into the open position, simultaneously the associated supply-permitting solenoid valve 42 or 43 or 44 or 45 being closed. The brake pedal 28 will remain blocked in this case as the pressure medium existing in the annular chamber 24 cannot return because of the check valve 53 closed by the pressure of the branch line 62.

In case the driver wants to release the brake pedal 28, (i.e., to release the brake), it must be ensured that the intermediate piston 18 and the booster piston 21 can return into their initial positions illustrated in the drawing. To this end, a non-return valve 49 is arranged in the piston 63 of the check valve 53 which permits further pressure medium to be sucked into the annular chamber 24 so that the springs 70, 71 arranged in the working chambers 8, 15 easily can move back all the pistons 6, 7, 18, 21 supported in the bore sections 3, 4, 5, and in the booster chamber 25.

As can be seen in the drawing, the intermediate piston 18 and the booster piston 21 are coupled together by way of a cross bolt 50 reaching through an elongated hole 73 arranged in the pedal-side projection 72 of the intermediate piston 18. Elongated hole 73 will permit a limited sliding-back of the booster piston 21 in case the pressure medium is dynamically supplied to the wheel brakes 10, 17, 38, 39 by way of the pump 74 and the accumulator 75.

What is claimed is:

1. A slip-controlled brake system for automotive vehicles comprising, in combination:
    a pedal-actuated pressure generator including a master cylinder having first and second working chambers therein with each working chamber having a piston slidably mounted therein and said pressure generator having a booster chamber therein and said booster chamber having a pedal-actuated booster piston slidably mounted therein;
    a pressure medium supply reservoir;
    an auxiliary pressure source having an input connected to said supply reservoir and an output connected to said booster chamber;
    an intermediate piston slidably mounted in an annular chamber of said pressure generator between said booster chamber and said first working chamber, said intermediate piston being connected at one end thereof to said booster piston and said intermediate piston engaging one end of the piston in said first working chamber at its other end thereof; and,
    a check valve connected between a housing port of said pressure generator which opens into said annular chamber and said supply reservoir, said check valve having a control input connected to said booster chamber for closing the connection between said annular chamber and said supply reservoir when the pressure in said booster chamber exceeds a predetermined level.

2. The brake system according to claim 1, wherein said check valve comprises a check valve piston sidably mounted within a check valve housing, said check valve piston being resiliently urged away from a valve seat opening in said check valve housing and said check valve piston having a closure member for engaging and closing said valve seat opening when said check valve piston is translated toward said valve seat opening.

3. The brake according to claim 2, wherein said check valve piston includes a non-return valve connected between said valve seat opening and said supply reservoir to permit pressure medium to be sucked into said annular chamber when said booster piston is deactuated thereby translating said intermediate piston and its connected booster back toward the pedal of said vehicle.

4. The brake system according to claim 1, wherein the connection of said intermediate piston and said booster piston includes a slotted portion along one of the connected pistons which slidably engages a fixed member on the other of the connected pistons whereby said connected pistons are movable toward and away from each other by a distance determined by the length of said slotted portion.

5. The brake system according to claim 1, including a pressure limiting valve connected between said booster chamber and said input of said check valve wherein said limiting valve opens the connection between said booster chamber and said input of said check valve when the pressure in said booster chamber exceeds a predetermined level.

* * * * *